United States Patent
Williams et al.

(10) Patent No.: US 6,920,172 B2
(45) Date of Patent: Jul. 19, 2005

(54) DUAL PURPOSE SPREAD SPECTRUM RADIO RECEIVERS WITH CONTROLLED FREQUENCY REJECTION

(75) Inventors: Stephen A Williams, Southampton (GB); Andrew Knowles, Southampton (GB)

(73) Assignee: 3Com Corporation, Santa Clara, CA (US)

( * ) Notice: Subject to any disclaimer, the term of this patent is extended or adjusted under 35 U.S.C. 154(b) by 913 days.

(21) Appl. No.: 09/750,783

(22) Filed: Jan. 2, 2001

(65) Prior Publication Data

US 2002/0057726 A1 May 16, 2002

(30) Foreign Application Priority Data

Nov. 11, 2000 (GB) .............................................. 0027631

(51) Int. Cl.[7] .................................................. H04B 1/69
(52) U.S. Cl. ....................................................... 375/136
(58) Field of Search .................................. 375/136, 130, 375/135, 132, 316, 295

(56) References Cited

U.S. PATENT DOCUMENTS

| 6,243,370 B1 * | 6/2001 | Schilling | 370/335 |
| 2002/0006171 A1 * | 1/2002 | Nielsen | 375/316 |

FOREIGN PATENT DOCUMENTS

| EP | 0633677 A2 | 1/1995 |
| GB | 2279851 A | 1/1995 |
| GB | 2326783 A | 12/1998 |

* cited by examiner

Primary Examiner—Khai Tran
(74) Attorney, Agent, or Firm—Nixon & Vanderhe P.C.

(57) ABSTRACT

A receiver for a direct sequence spread spectrum signal subject to interference from a locally transmitted or received frequency-hopped spread spectrum signal includes a programmable notch filter which is controlled in accordance with the code sequence of a frequency-hopped signal to reject frequencies corresponding to those producing interference

20 Claims, 3 Drawing Sheets

DUAL PURPOSE SPREAD SPECTRUM RADIO RECEIVERS WITH CONTROLLED FREQUENCY REJECTION

FIELD OF THE INVENTION

This invention relates to spread spectrum radio receivers and particularly those which include two receiving channels for the respective reception, despreading and demodulation of signals coded by a respective spread spectrum technique The invention is particularly though not exclusively intended for use in radio receivers which incorporate units that can form part of a packet-based data communication system and have a facility for communicating with other units in the system over a wireless link.

More particularly the invention relates to a system in which a receiver for a first spread spectrum system is in close proximity with a transmitter or receiver or, more usually, a transceiver capable of both transmission and reception for a second spread spectrum system of which the spread spectrum includes frequency-hopped components that fall partly or wholly within the spread spectrum of the first system.

BACKGROUND TO THE INVENTION

Spread spectrum systems for the transmission and reception of signals, particularly in wireless transmission, has been established for many years. A general description of such systems is given, for example in 'Spread Spectrum Systems', by Robert C Dixon, published by John Wiley and Sons (Second Edition, 1984). Spread spectrum techniques have proved versatile and effective in discriminating against both broadband noise and specific interfering signals, since the correlation process (otherwise called despreading) in accordance with the original spreading will spread an interfering signal and thereby reduce the amplitude of its frequency components relative to the components of the desired and despread signal Nevertheless, spread spectrum receivers are not proof against interference and where there is a strong interfering signal within the effective bandwidth of the spread spectrum signal, a substantial error rate is likely The effects of a single interfering signal can to some extent be countered by employing redundancy in the transmitted signal, though that is not a desirable solution in general except possibly for systems where a high degree of security at the cost of a lower effective information rate is desirable.

There are three general techniques for producing spread spectrum signalling, namely the modulation of a carrier by a digital code sequence, known as 'direct sequence' modulation, the sweeping of a carrier over a wideband during a given pulse interval, often called 'chirp' modulation, and carrier frequency shifting in discrete increments in a pattern dictated by a code sequence, usually termed 'frequency-hopping' The present invention relates to systems which include a receiver for a first spread spectrum system (particularly a 'direct sequence' system) and apparatus, which may be a transmitter or receiver or transceiver, which can transmit and/or receive a frequency-hopped spread spectrum signal that for at least part of the time is within the spread spectrum of the signal intended for reception by the first receiver.

In a pertinent example to which the invention relates, a radio receiving apparatus may include a first receiver (which may form part of a transceiver) which is intended to receive a spread spectrum signal produced in accordance with IEEE Standard 802.11b. The apparatus also includes either a transmitter or receiver (and more usually both) which operates according to a frequency-hopped spread spectrum system, for example that which is commercially termed a 'Bluetooth' system A receiver of this nature is provided in order to be able to communicate with devices operating with two different spread spectrum transmission standards In this particular example, the Standard prescribed by IEEE 802.11b specifies a spread spectrum transmission that effectively occupies a bandwidth of 22 MHz within the range 2400 to 2480 MHz The 'Bluetooth' transmission is a frequency-hopped transmission which occupies a 1 MHz band for a short period of time before being frequency-hopped The total allocated bandwidth is of the order of 80 MHz The usable spectrum of a 802.11b signal only employs 22 MHz of this bandwidth However, the 'Bluetooth' signal will hop in to the same frequency band as the 802.11b signal about one quarter of the time.

An 802.11b receiver will accept the corresponding spread spectrum signal and despread it to recover the original signal During this process, any narrow band interfering signal will be spread out and the interference is reduced in level. In normal operation, the ratio $E_s/N_o$, where $E_s$ in the energy per signal and $N_o$ is the normalised noise, is about 8 decibels for an 11 Mbps data rate. If the noise (represented by the 'Bluetooth' signal while it is within the bandwidth of the 802.11b spread spectrum signal) is more than 8 dB above the 802.11b spread signal, as may well be expected, then considerable interference will be experienced The present invention is therefore concerned with the reduction of interference in a spread spectrum transmission wherein the interference arises from a frequency-hopped signal which is received or transmitted locally.

SUMMARY OF THE INVENTION

The present invention particularly concerns a radio receiving apparatus which comprises a receiver for a first spread spectrum radio signal and includes means for receiving, and despreading the first spread spectrum signal and also comprises a sequence generator for controlling the generation sequence of a frequency-hopped signal for processing (i.e. spreading or despreading) a second spread spectrum signal In the particular circumstances previously described and similar circumstances wherein the frequency-hopped signal comprises a sequence of fundamental components within the effective band of the first spread spectrum, the receiver for the first spread spectrum signal includes according to the invention a programmable rejection filter acting on the first spread spectrum signal before that signal is despread The filter is controlled in accordance with the code sequence of the sequence generator to provide rejection of frequency components corresponding to those in the frequency-hopped spread spectrum signal.

The programmable rejection filter may be disposed within an intermediate frequency section of the receiver for the first spread spectrum radio signal The sequence generator will either determine the sequence of carrier frequencies and the switching intervals between them in a transmitted frequency-hopped signal or determine corresponding frequencies (which may be the same frequencies or related frequencies in a different frequency band) for a receiver. In any event the sequence generator will determine the frequency-hopped signal and therefore can be used to determine a set of frequencies which correspond to the relevant components in the radio frequency signal or, for example, corresponding components in an intermediate frequency version thereof. Thus the programmable filter can be controlled (preferably by the aforementioned sequence generator) to provide specific rejection of components which correspond, having regard to any frequency changing within the first receiver, to the frequency hopped carrier in the second spread spectrum signal.

If the sequence generator is that employed in a receiver for the frequency-hopped spread spectrum signal, then the rejection provided by the programmable filter will not be effective until the frequency-hopped spread spectrum receiver is properly synchronised or correlated with the spread spectrum signal that it should receive.

Further objects and features of the invention will be apparent from the accompanying drawings.

DETAILED DESCRIPTION

Figure 1:
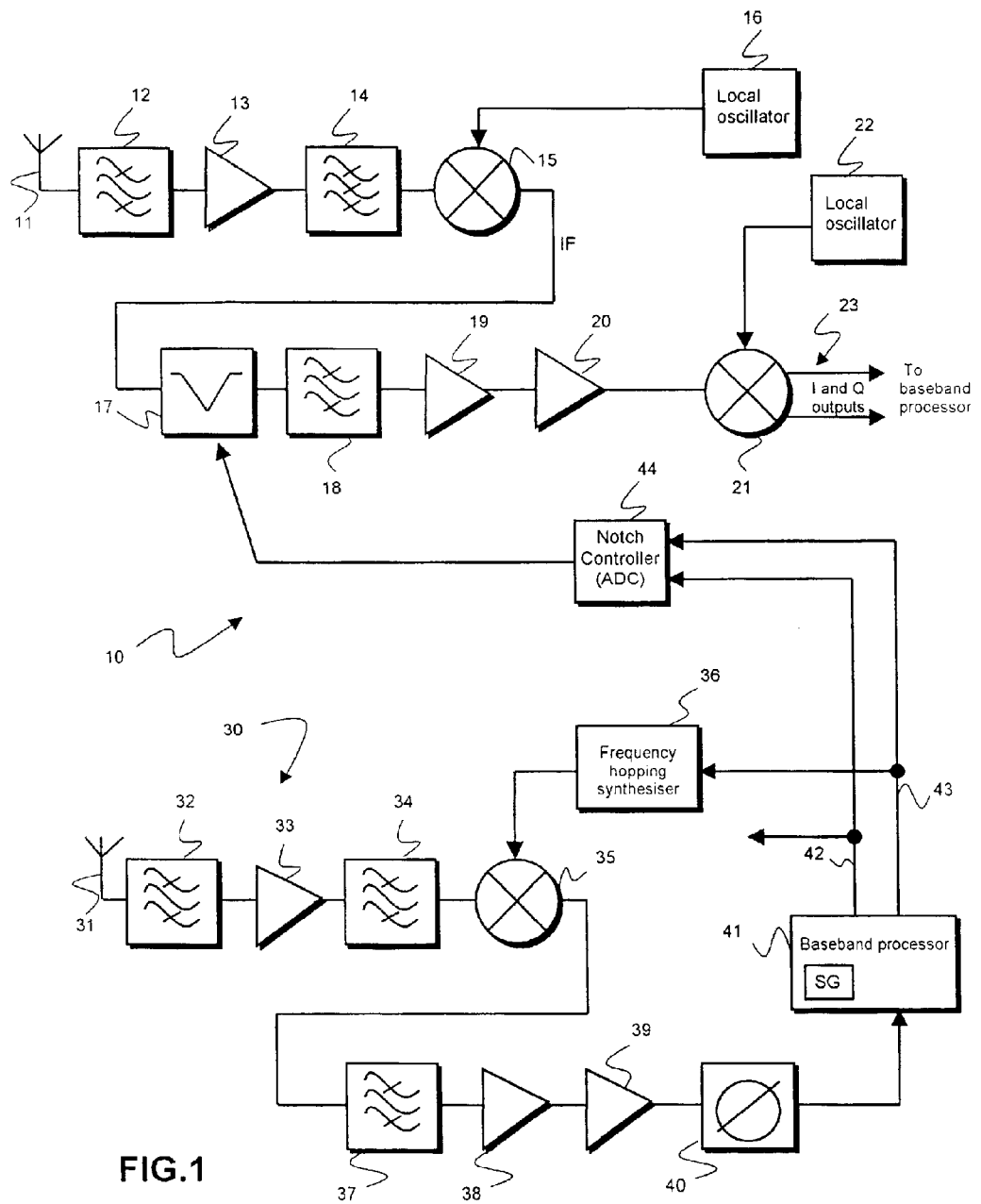
FIG. 1 illustrates a first embodiment of the invention.
Figure 2:
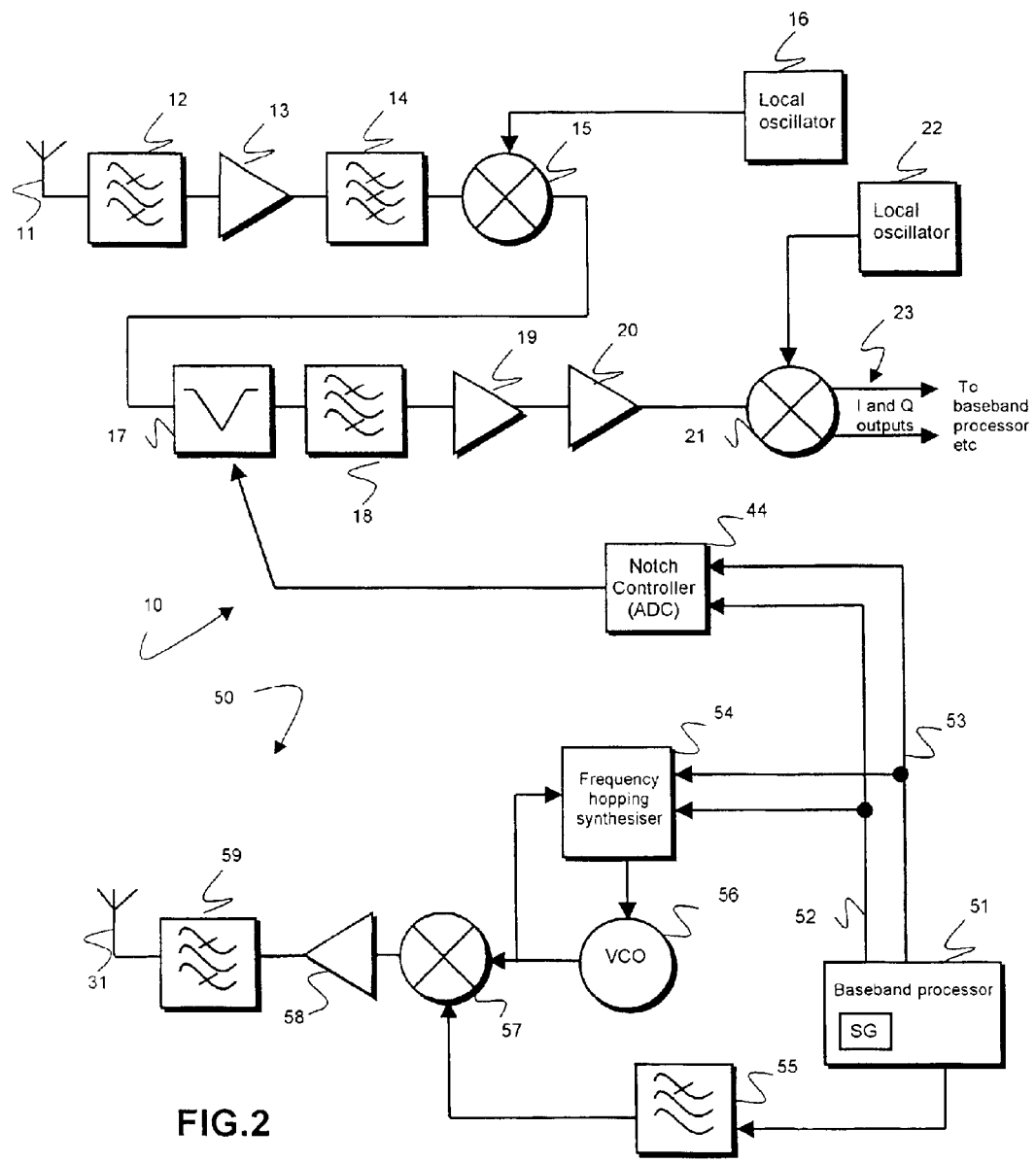
FIG. 2 illustrates a second embodiment of the invention.

FIG. 1 of the drawings illustrates part of a dual-purpose apparatus which can receive, despread and ultimately demodulate spread spectrum signals according to two standards, first a 'direct-sequence' spread spectrum signal conforming to IEEE Standard 802.11b and secondly a frequency-hopped spread spectrum signal conforming to the Bluetooth 1.0 specification FIG. 2 of the drawings illustrates a different combination of features from such a transceiver, showing the same receiver (10) for the first spread spectrum and a transmitter (50) for a frequency-hopped spread spectrum signal. It will be understood that in practice the apparatus in order to be fully functional for both systems would contain both a transmitter and a receiver for each of the spread spectrum systems but the invention may be embodied in a device having only receivers for both systems, as shown in FIG. 1 or even a receiver for one system and only a transmitter for another, as shown in FIG. 2.

The receiver 10 in FIG. 1 is, as previously mentioned, intended for a spread spectrum signal conforming to IEEE Standard 802.11b. Signals received at an antenna are bandpass filtered (the bandwidth extending from 2400 to 2480 MHz) The bandwidth limited signal is amplified in linear amplifier 13 and subject to further bandpass filtering in bandpass filter 14 The spread spectrum signal is converted to an intermediate frequency band by means of a first mixer 15 and a local oscillator having a frequency within the range 2050 to 2130 MHz The intermediate frequency band of the down converted input signal is of the order of 350 MHz In this embodiment of the invention the intermediate frequency signal is subject to a programmable rejection filter 17 controlled in a manner to be described later. For the sake of completeness however the operation of the remainder of the receiver will be described first The intermediate frequency signal is bandpass filtered in filter 18 and subject to automatic gain control by variable gain intermediate frequency amplifiers 19 and 20. The intermediate frequency signal thereby obtained is input to a mixer 21 coupled to a second local oscillator 22. The mixer may be a double balanced mixer producing in-phase and quadrature outputs I and Q which are fed out on lines 23 to further processing stages (including a baseband processor), which will be described with reference to FIG. 3 and by means of which the original signal is recovered in a manner well known in itself. With the exception of the programmable filter 17 the receiver just described is known in the art In systems other than, for example, those conforming to IEEE 802.11b, the mixer 21 could be a correlative mixer which provides despreading.

FIG. 1 also includes a 'Bluetooth' receiver 30 for a frequency-hopped spread spectrum signal. A signal received at an antenna 31 (which may be the same as antenna as antenna 11 or separate from it), is bandpass filtered in filter 32, amplified in linear amplifier 33, subject to further bandpass filtration in bandpass filter 34 and coupled to a first mixer 35. This mixer is a correlative or despreading mixer which is coupled to the output of a frequency-hopping synthesiser 36, which in normal operation produces a sequence of frequency-hopped radio frequency signals corresponding to the frequency-hopped sequence of carrier signals which were used to spread the spectrum of the original information bearing signal at the transmitter The down converted input signal is subject to bandpass filtration in filter 37 and is fed through amplifier stages 38 and 39 to a demodulator 40. This demodulator 40 provides baseband input signals to a baseband processor 41 which includes, as is usual, a sequence generator SG that determines the hop rate and the sequence of signals to be produced by the frequency-hopping synthesiser. In normal operation the synthesiser has to be synchronised to the frequency-hopping sequence in the receive signal. Methods of synchronisation are well established, as discussed for example in standard textbooks such as Dixon, previously cited In any event receiver 30 is intended to conform to an ordinary receiver according to the Bluetooth 1.0 standard. It is sufficient to note that such a receiver 30 includes a sequence generator (SG) which in normal operation will be synchronised to the received frequency-hopping sequence and will produce on output lines 42 and 43 data which identifies the frequencies in the frequency-hopping sequence and data which determines the duration and timing of the hops in the sequence.

In the embodiment shown in FIG. 1, the signals on lines 42 and 43 operate a notch controller 44 which may be an analogue to digital converter that controls the programmable rejection filter 17 so that for a given frequency produced by the synthesiser 36 a corresponding centre frequency is selected for the filter 17. By 'corresponding' in this particular case is meant the intermediate frequency to which the radio frequency corresponding to that produced by the synthesiser will be converted by the first mixer 15 in the receiver 10.

Thus the programmable filter 17 is stepped through a sequence to reject at each hop an intermediate frequency corresponding to that component in the frequency-hopped spread spectrum signal which is interfering with the first spread spectrum signal.

Figure 3:
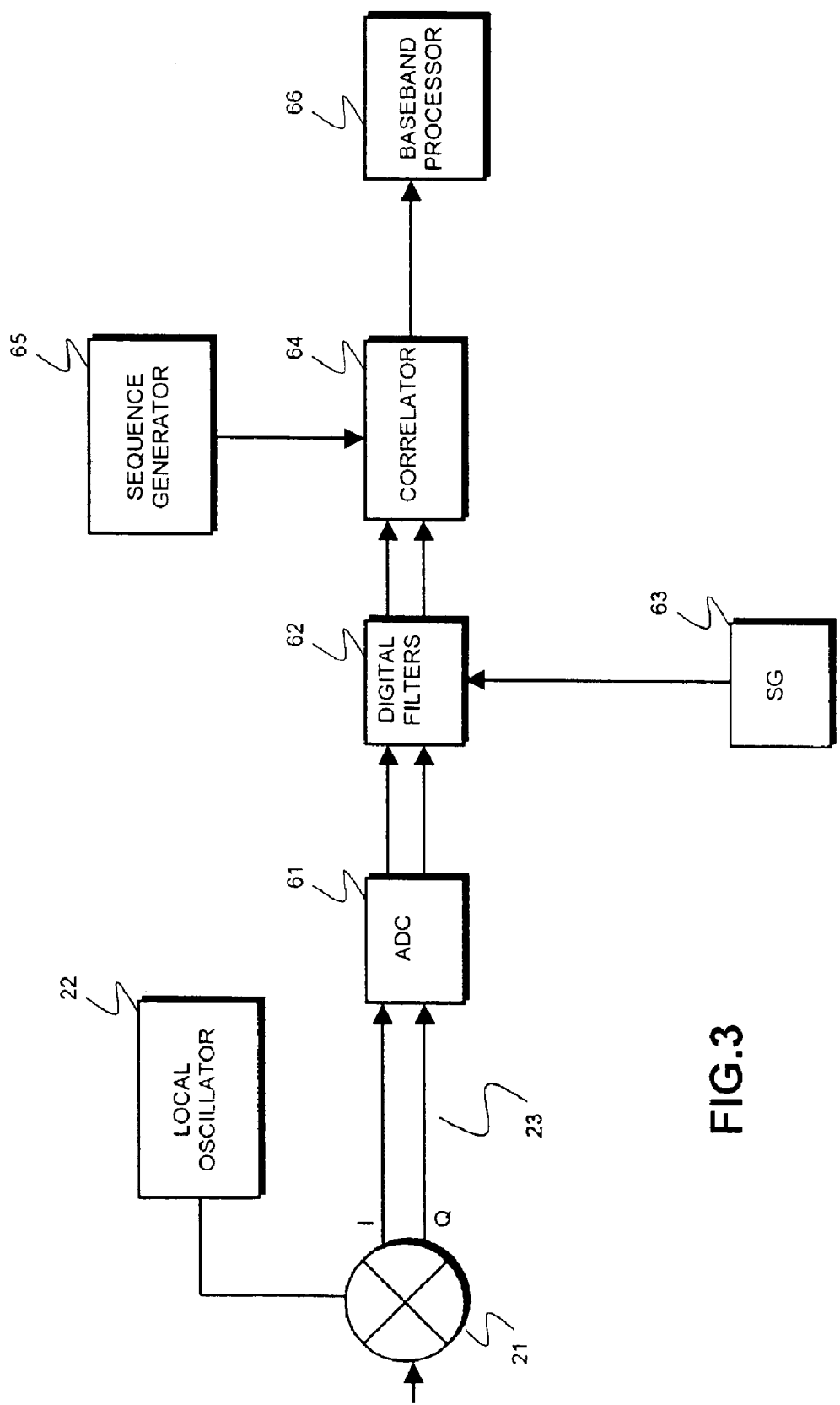
FIG. 3 illustrates a third embodiment of the invention

It would be possible to dispose the programmable filter elsewhere in the receiver 10, for example after an analogue to digital conversion stage as shown in FIG. 3 or, theoretically, prior to the conversion to an intermediate band. However, it is preferable to dispose the rejection filter in the intermediate stage or subsequently, provided that it is disposed prior to correlative despreading of the spread spectrum signal.

Although the despreading of the spread spectrum signal in receiver 10 inherently provides discrimination against noise in general and also specific interfering signals in particular, because such signals are spread because they lack correlation with the spread spectrum signal which the receiver 10 is designed to receive, the gain achieved by despreading may only be of the order of eight decibels and therefore a strong signal, such as will be provided by a receiver 30 in close proximity with receiver 10 may still produce substantial interference which the programmable filter 17 is designed to reduce Typically, the filter 17 may provide 20 dB attenuation at the (selectable) notch frequency The filter 17 may be constructed, in a manner known per se, of varacter diodes which are controllable to provide, in circuit with passive components, a variable 'notch' frequency which can be shifted at the comparatively slow rates which are characteristic of frequency-hopped spread spectrum signals FIG. 2 illustrates a different arrangement in which the receiver 10 is controlled by a sequence generator for a spread spectrum frequency-hopped transmitter 50 As previously indicated, the apparatus will normally include both a transmitter and receiver, which may share some common components, for a frequency-hopped spread spectrum communication system Transmitter 50 in FIG. 2 is intended to be in standard form and includes a baseband processor 51, which provides for modulation of an information bearing signal on to a carrier signal which is filtered by low-pass filter 55. A frequency-hopped signal is generated by a voltage-controlled oscillator 56 controlled by a frequency-hopping synthesiser which is controlled by outputs 52 and 53 from baseband processor 51 in a manner corresponding to the control of synthesiser 56 but outputs 42 and 43 in FIG. 1. The output of oscillator 56 is modulated in a mixer 57 by the output of filter 55, and is fed through a power amplifier 58 and a bandpass filter 59 that limits the output frequencies to the range 2400 to 2480 MHz As in the embodiment previously described, the receiver 10 includes a notch filter 17 controlled by a notch controller 44 by the outputs 52 and 53 that represent the code sequence and timing and the control of notch filter corresponds to that previously described with reference to FIG. 1

However, the system shown in FIG. 2 may be easier in practice to operate because acquisition of synchronisation is no longer necessary It is mentioned in the foregoing that the 'Bluetooth' signal is within the band occupied by the 802.11b signal for only approximately a quarter of the time, specifically for twenty-two intervals out of the seventy-nine intervals. When the programmable filter is not required by the frequency-hopping code sequence to provide rejection of a component corresponding to one in the frequency-hopped spread spectrum signal, it may be switched to a bypass mode in which it provides no attenuation or be switched to a frequency which is outside the range of interest FIG. 3 illustrates an embodiment in which a digital notch filter is disposed in the receiver 30 after the I and Q signals from mixer 21 have been converted to digital form and at a stage subsequent to the IF stage but before despreading FIG. 3 illustrates for the most part the stages of a receiver conforming to IEEE 802.11b following the mixer 21 The I and Q signals on lines 23 are subject to analog to digital conversion in ADC 61

The digital signals are subject to digital filtration by filters 62, which reject in sequence the frequencies corresponding to the interfering components of the frequency-hopped signal. The filters 62 are controlled by the sequence generator 63, which may be the sequence generator SG in either FIG. 1 or FIG. 2

Thereafter the filtered spread spectrum signal is fed to digital correlator 64 controlled by a direct sequence generator 65 to provide a despread signal to a baseband processor 66 in known form.

What is claimed is:

1. A radio receiving system comprising:
   a receiver for a first spread spectrum radio signal, said receiver including means for receiving and dispreading said first spread spectrum signal; and a sequence generator for controlling a code sequence of a frequency-hopped signal for processing a second spread spectrum signal;
   wherein the receiver for the first spread spectrum signal includes:
   a programmable rejection filter for the first spread spectrum signal before that signal is despread; and means for controlling said programmable rejection filter in accordance with said code sequence to provide selective attenuation of frequency components which correspond to components in the frequency-hopped signal and are within the bandwidth of the first spread spectrum signal.

2. A system according to claim 1 wherein the receiver includes a mixer for converting the first spread spectrum signal to an intermediate frequency band and the programmable rejection filter provides rejection of said frequency components that have been converted to frequencies within said intermediate frequency band.

3. A system according to claim 1 wherein the receiver includes means for down-converting the first spread spectrum signal to I and Q signals in a low-frequency band and means for converting said I and Q signals to digital signals and wherein said programmable rejection filter comprises digital filters for said digital signals.

4. A system according to claim 1 wherein the system includes a second receiver for the second spread spectrum signal and the sequence generator is coupled to a frequency-hopping synthesizer for said second receiver.

5. A system according to claim 1 wherein the system includes a transmitter for the second spread spectrum signal and the sequence generator is coupled to a frequency-hopping synthesizer for said transmitter.

6. A radio receiving system comprising:
   a receiver for a first spread spectrum radio signal, said receiver including means for receiving and dispreading said first spread spectrum signal; and a sequence generator for controlling the generation of a frequency-hopped signal for spreading or dispreading a second spread spectrum signal;
   wherein the receiver for the first spread spectrum signal includes a programmable rejection filter for the first spread spectrum signal before that signal is despread, said programmable rejection filter being coupled to and controlled by the sequence generator to provide selective attenuation of frequency components which correspond to components in the frequency-hopped signal and are within the bandwidth of the first spread spectrum signal.

7. A system according to claim 6 wherein the receiver includes a mixer for converting the first spread spectrum signal to an intermediate frequency band and the programmable rejection filter provides rejection of said frequency components that have been converted to frequencies within said intermediate frequency band.

8. A system according to claim 6 wherein the receiver includes means for down-converting the first spread spectrum signal to I and Q signals in a low-frequency band and means for converting said I and Q signals to digital signals and wherein said programmable rejection filter comprises digital filters for said digital signals.

9. A system according to claim 6 wherein the system includes a second receiver for the second spread spectrum signal and the sequence generator is coupled to a frequency-hopping synthesizer for said second receiver.

10. A system according to claim 6 wherein the system includes a transmitter for the second spectrum signal and the sequence generator is coupled to a frequency-hopping synthesizer for said transmitter.

11. A method for receiving a first spread spectrum radio signal, said method comprising:
 receiving and dispreading said first spread spectrum signal;
 controlling a code sequence of a frequency-hopped signal for processing a second spread spectrum signal; and
 controlling a programmable rejection filter for the first spread spectrum signal before that signal is despread in accordance with said code sequence to provide selective attenuation of frequency components which correspond to components in the frequency-hopped signal and are within the bandwidth of the first spread spectrum signal.

12. A method as in claim 11 wherein a mixer converts the first spread spectrum signal to an intermediate frequency band and the programmable rejection filter provides rejection of said frequency components that have been converted to frequencies within said intermediate frequency band.

13. A method as in claim 11 further comprising down-converting the first spread spectrum signal to I and Q signals in a low-frequency band and converting said I and Q signals to digital signals and wherein said programmable rejection filter comprises digital filters for said digital signals.

14. A method as in claim 11 further comprising receiving the second spread spectrum signal using said code sequence coupled to a frequency-hopping synthesizer.

15. A method as in claim 11 wherein a transmitter for the second spread spectrum signal uses a frequency-hopping synthesizer coupled to said code sequence.

16. A method for receiving a first spread spectrum radio signal, said method comprising:
 receiving and dispreading said first spread spectrum signal;
 controlling the generation of a frequency-hopped signal for spreading or dispreading a second spread spectrum signal; and
 applying a programmable rejection filter to the first spread spectrum signal before that signal is despread, said programmable rejection filter being coupled to and controlled by the frequency-hopped signal to provide selective attenuation of frequency components which correspond to components in the frequency-hopped signal and are within the bandwidth of the first spread spectrum signal.

17. A method as in claim 16 wherein a mixer converts the first spread spectrum signal to an intermediate frequency band and the programmable rejection filter provides rejection of said frequency components that have been converted to frequencies within said intermediate frequency band.

18. A method as in claim 16 further comprising:
 down-converting the first spread spectrum signal to I and Q signals in a low-frequency band and converting said I and Q signals to digital signals and wherein said programmable rejection filter comprises digital filters for said digital signals.

19. A method as in claim 16 further comprising:
 receiving the second spread spectrum signal using said frequency-hopped signal coupled to a frequency-hopping synthesizer.

20. A method as in claim 16 wherein a transmitter for the second spread spectrum signal uses said frequency-hopped signal coupled to a frequency-hopping synthesizer.

* * * * *